United States Patent [19]

Hafele

[11] Patent Number: 4,610,092
[45] Date of Patent: Sep. 9, 1986

[54] METHODS AND FIXTURES FOR INSTALLING DRAPERY BRACKETS AND THE LIKE

[76] Inventor: Harry M. Hafele, 4454 Kitty La., Batavia, Ohio 45103

[21] Appl. No.: 773,531

[22] Filed: Sep. 9, 1985

[51] Int. Cl.⁴ .............................................. B23B 49/02
[52] U.S. Cl. ...................................... 3/180 R; 33/189
[58] Field of Search ...................... 33/180 R, 189, 191, 33/562, 481, 479, 480, 429

[56] References Cited

U.S. PATENT DOCUMENTS

| | | | |
|---|---|---|---|
| 313,197 | 3/1885 | Gaylord | 33/562 |
| 720,824 | 2/1903 | Lieber | 33/189 |
| 3,156,984 | 11/1964 | Palmer | 33/189 |
| 3,246,399 | 4/1966 | Southern | 33/562 X |
| 3,371,423 | 3/1968 | Paul | 33/189 |
| 4,257,166 | 3/1981 | Barker | 33/189 X |

*Primary Examiner*—Harry N. Haroian

[57] ABSTRACT

A gauge to aid in locating brackets for hanging drapes and the like. The gauge has positioning structure with right angularly related surfaces and a gauge plate having a grid of locating marking openings extending therethrough. A marking pin is insertable through a selected opening when the angularly related surfaces register at a corner of a window opening and the plate is against the wall.

3 Claims, 4 Drawing Figures

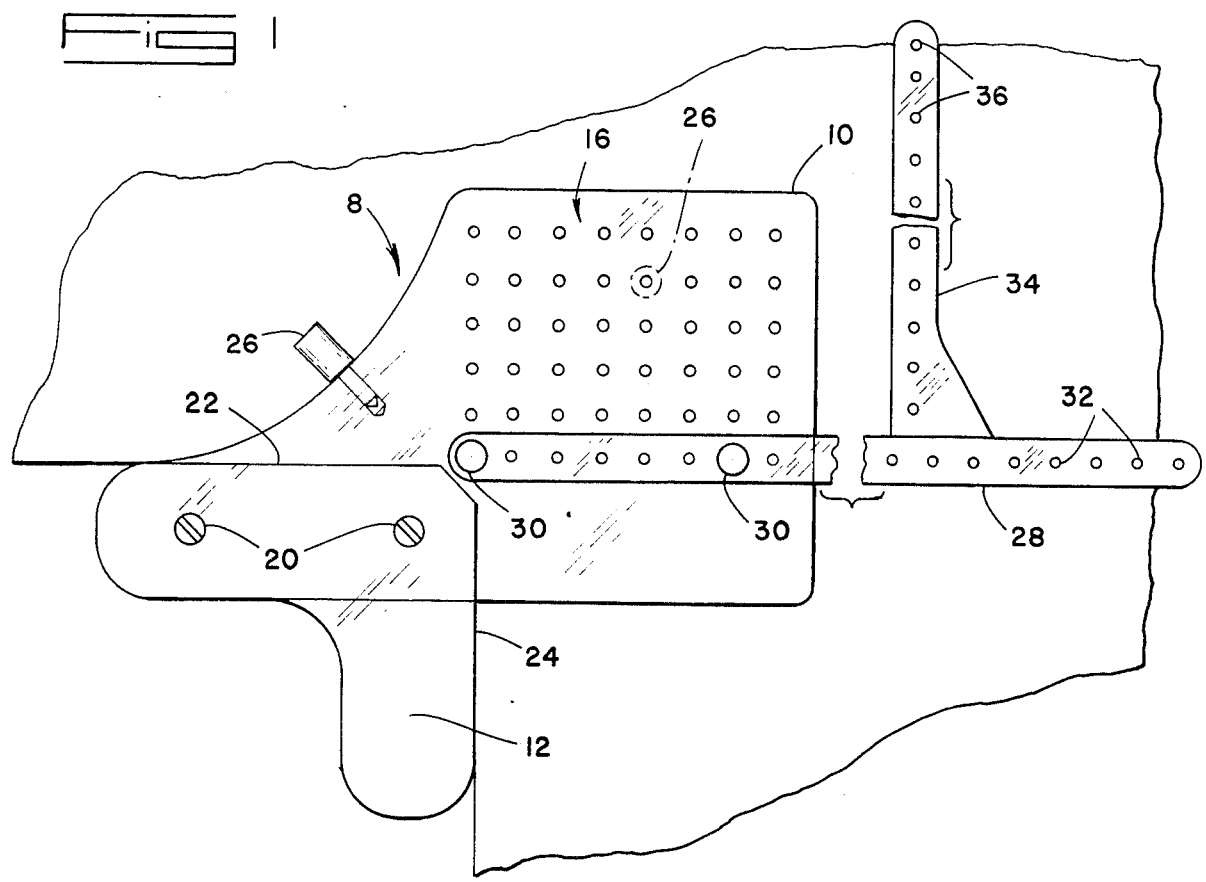
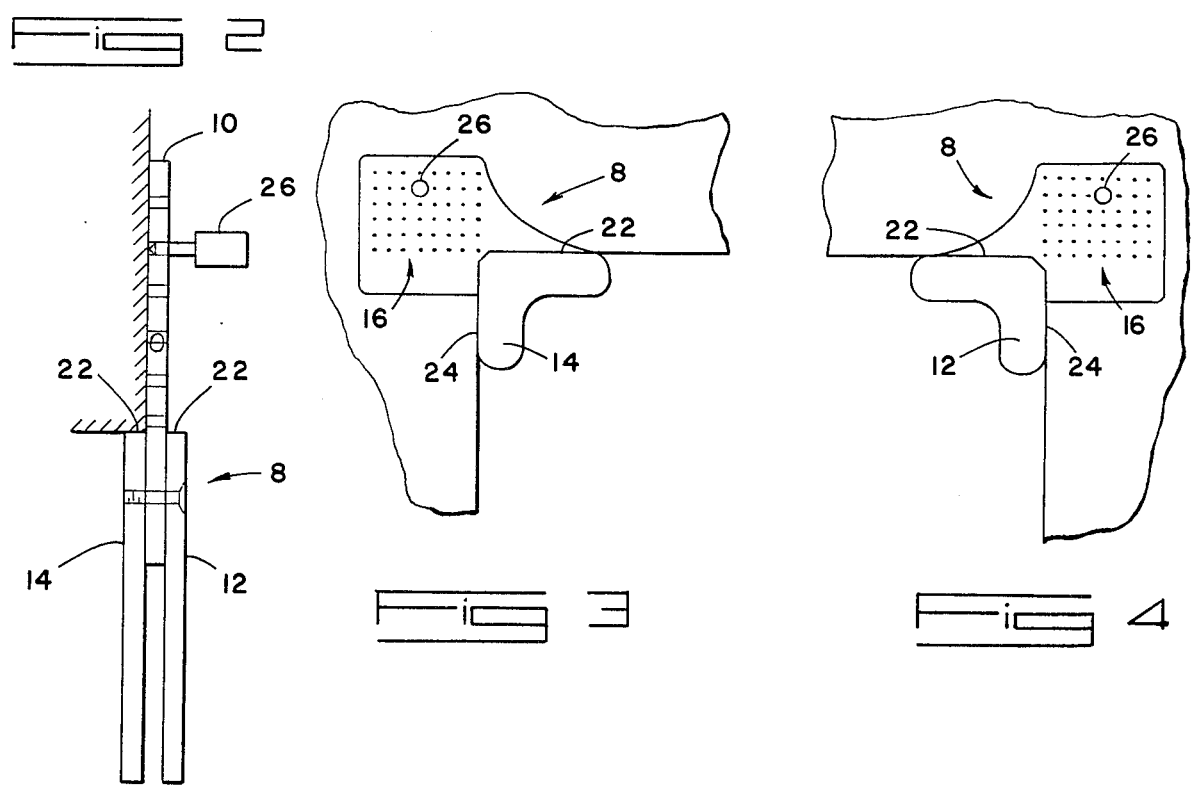

METHODS AND FIXTURES FOR INSTALLING DRAPERY BRACKETS AND THE LIKE

The present invention relates to improvements in methods and fixtures for the installation of drapery brackets, window shade brackets and similar brackets for installing other window coverings or ornamentation.

When installing window shades, draperies, or the like, it is, in most instances, essential that the brackets therefor be located symmetrically of the window opening. In the past this has been a time consuming procedure, wherein a bracket is positioned adjacent one, upper corner of the window opening at a location which is aesthetically appealing. Then, appropriate measurements are taken, in one fashion or another, and a second bracket is located symmetrically adjacent the opposite, upper corner of the window opening.

This procedure frequently results in errors, requiring one bracket or the other to be reset in order to obtain the desired symmetry and aesthetic affect. Where several windows require the same window treatment, it becomes even more painstaking to locate mounting brackets, not only symetrically, but identically relative to all openings. The adverse visual impact of as little as one eight of an inch is, perhaps surprisingly, apparent to most people. Thus great pains are taken by installers to achieve accuracy in positioning these brackets.

Despite this obvious need, going back well into the last century, if not much further, simple scales and makeshift gauges have been relied upon in the mounting of these brackets, even by "professionals" who make such installations on a day-to-day basis.

Accordingly the object of the present invention is to reduce the time required to mount brackets for draperies, or the like, with an assurance that they are symmetrical to a window opening, as well as being aesthetically positioned.

In accordance with these objectives a fixture is provided which comprises a gauge plate which is registered with one, upper corner of a window opening by positioning means which project from one side thereof. The bracket to be mounted, is placed on the gauge plate in a position which is aesthetically pleasing and then a hole for mounting the bracket is brought into registration with one of a grid of locating openings which is formed in the gauge plate. A marking pin is then inserted through this hole to mark the wall surface where the bracket is to be mounted. The fixture is then registered with the opposite upper corner of the window opening by positioning means which project from the opposite side of the gauge plate and are aligned with the first positioning means. The marking pin is then inserted through the same locating opening to mark the wall surface for symmetrical mounting of the bracket on the opposite side of the window opening.

Where it is desired to mount brackets in substantially offset relation from the window opening, horizontal and vertical extension bars may be provided. The horizontal extension bar may be detachably mounted on the gauge plate by pins inserted therethrough and extending into locating holes of the grid. The portion of the extension which projects beyond the gauge plate is then provided with locating openings through which the marking pin may be inserted to mark the desired location of a bracket. The vertical extension may be slideably positioned on the the horizontal extension and is also provided with locating openings through which the marking pin may be inserted to mark the desired location of a bracket.

These extensions can then be reversed to the opposite side of the gauge plate to obtain a symmetrical positioning of the bracket on the opposite side of the window.

The above and other related objects and features of the invention will be apparent from a reading of the following description of a preferred embodiment, with reference to the accompanying drawing, and the novelty thereof, pointed out in the appended claims.

In the drawing:

FIG. 1 is a plan view of the present fixture for locating brackets for draperies, or the like;

FIG. 2 is a side view of the fixture seen in FIG. 1;

FIG. 3 is a view, on a reduced scale, illustrating use of the present fixture in locating a bracket relative to the left corner of a window opening; and FIG. 4 is a view, on a reduced scale illustrating use of the fixture in symmetrically locating a bracket relative to the right corner of the window opening.

The present fixture, indicated generally by reference character 8, is quite simple, comprising a gauge plate 10 and corner positioning plates 12, 14 projecting from opposite surfaces of the gauge plate 10. A grid 16 of locator openings, or holes, 18 is provided in the gauge plate 10, generally above and to the side of the positioning plates 12, 14 which will be outwardly and above the window opening. The holes 18 are, preferably, equally spaced on half inch centers.

The fixture 8, or at least the gauge plate 10, is preferably formed of a clear, transparent, relatively rigid material. Several so called "plastic" materials may be employed, Lucite merely being illustrative. The positioning plates 12, 14 may be formed integrally with the gauge plate 10, or, as here illustrated, be formed as separate members, attached to opposite sides of a lower corner of the gauge plate 10, by screws 20.

The positioning plates 12, 14 have aligned, surfaces 22, 24 respectively disposed at right angles to each other and to the rows of holes in the grid 16. The surfaces 22, 24 are adapted to engage the upper inside corners of a window opening, permitting the grid 16, of locator holes, to be positively registered with respect thereto.

The positioning plates 12, 14 also function as a handle, permitting the gauge plate 10 to be placed flush against a vertical wall surface and the surfaces 22, 24 to be firmly held against the surfaces of the upper corner of the window opening. The bracket 8 is shown, so positioned, in the upper right hand corner of a window opening in FIGS. 1 and 2, as well as FIG. 4. A bracket to be installed can then be positioned on the outer surface of the gauge plate 10 and brought to a desired aesthetic position. When the bracket is so positioned, one of its mounting screw holes can be brought into registration with one of the locator holes 18 in the grid 16.

With the desired locator hole 18 thus identified, a marking pin 26, conveniently stored in a recess in the side surface of the gauge plate 10, may then inserted in the identified locator hole 18 and pressed inwardly to mark the position of the mounting screw for the bracket.

The fixture 8 is then positioned in the upper left corner of the window opening, as indicated in FIG. 3, being positioned by the surfaces 22, 24 of the positioning plate 12. The marking pin 26 is then inserted through the same hole in the grid 16 to mark the location for a mounting screw which will be used in the corresponding mounting hole of the left hand bracket. Having thus located the position of one hole for each bracket, they can be secured to the wall surface, with assurance that they will be symmetrically disposed and aesthetically positioned.

In most instances drapery brackets, and the like will be mounted in fairly close proximity to the corner of a window opening. However, some installations require brackets to be mounted outside the limits of a locator plate of reasonable size. For such cases, a horizontal extension bar 28 (shown only in FIG. 1) is removeably positioned on the gauge plate 10 by headed pins 30. A series of locator holes 32 permit a bracket to be positioned to one far side of the window opening and then symmetrically to the opposite side, through use of the marking pin 26. A vertical extension bar 34 is provide, to accommodate positioning of brackets above a window opening, beyond the limits of a gauge plate 10 of reasonable size. The vertical extension bar 34 may be slideably positioned on the horizontal extension bar 28 and the marking pin then inserted through a selected locator hole 36 to mark a selected position for the bracket.

To obtain symmetry at the opposite side of the window opening, the fixture 8 is reversed, as before, and the horizontal extension is mounted on the opposite surface of the guage plate 10, in the same relative position. The same hole in extension 28, or extension 34 is the employed to symmetrically mark the placement of the bracket on this side of the window opening.

Variations in the described embodiment will occur to those skilled in the art, within the spirit and scope of the invention which are to be derived from the following claims.

Having thus described the invention, what is claimed as novel and desired to be secured by Letters Patent of the United States is:

1. A fixture for locating brackets employed in the installation of draperies, and the like, said fixture comprising a gauge plate having a grid of locating openings extending therethrough, positioning means projecting in opposite directions from the surfaces of said gauge plate and having aligned positioning surfaces disposed at right angles to each other and offset from the grid of locator openings, a horizontal extension bar detachably secured to the gauge plate and having locator openings spaced along its length, outwardly of the gauge plate, and a marking pin insertable through said openings whereby the gauge plate may be placed against a wall surface, with the grid of locator holes registered in fixed relation to one corner of a window opening by the positioning surfaces and the mounting position of a bracket marked by insertion of the marking pin through a selected locator opening, and then the bracket for the opposite side of the opening marked by positioning the gauge plate in the opposite corner of the opening and inserting the marking pin through the same locator opening.

2. A fixture as in claim 1 further comprising a vertical extension bar positionable on said horizontal extension bar and having locator openings spaced along its length, whereby the bracket may be positioned beyond the outline of the gauge plate.

3. A method of aesthetically and symmetrically mounting brackets for draperies and the like comprising the steps of positioning a fixture in one corner of a window opening, said fixture comprising a gauge plate having a grid of locator openings extending therethrough and positioning means projecting in opposite directions from the surfaces of said gauge plate and having aligned positioning surfaces disposed at right angles to each other and offset from the grid of locator openings, the surfaces projecting from one side of the gauge plate positively registering the gauge plate relative thereto, placing a bracket on said gauge plate in an aesthetic position and bringing one of its mounting holes into registration with a locator openings in said grid, inserting a marking pin through the hole identified in the previous step to mark the desired location for said bracket, positioning said fixture in the opposite corner of the window opening with the surfaces projecting from the opposite side of the gauge plate engaging the window opening and positively registering the gauge plate relative thereto, and inserting the marking pin through the same locator opening to mark the symmetrical position for the bracket at the opposite side of the opening.

* * * * *